Dec. 29, 1959   L. R. SMITH   2,919,148
SEAL ASSEMBLY
Filed Dec. 27, 1957
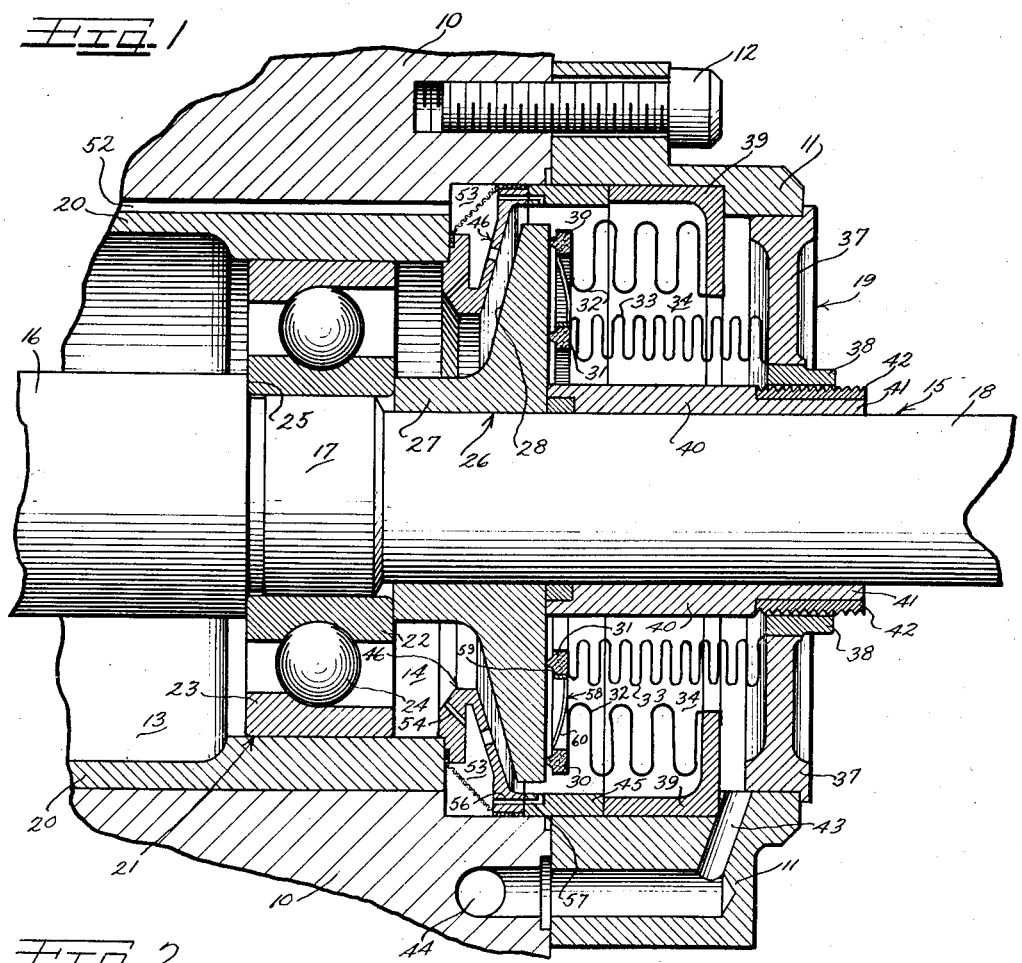
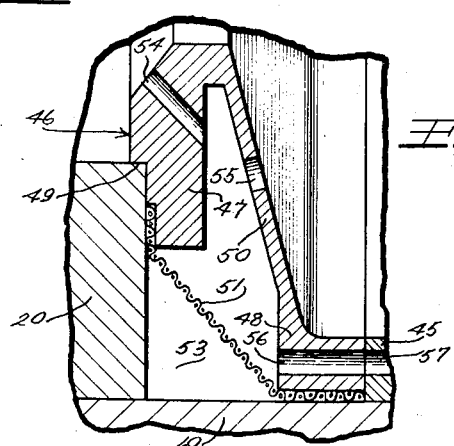
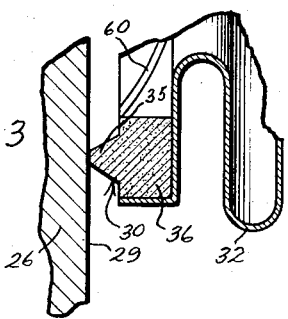
Inventor
LOUIS R. SMITH

United States Patent Office 2,919,148
Patented Dec. 29, 1959

2,919,148

SEAL ASSEMBLY

Louis R. Smith, Willoughby, Ohio, assignor to Thompson Ramo Wooldridge, Inc., a corporation of Ohio Application December 27, 1957, Serial No. 705,571

11 Claims. (Cl. 286—11)

The present invention relates broadly to seal assemblies, and is more particularly concerned with a novel arrangement which includes a pair of spaced concentric seals in contact with a common ring member and effective to prevent leakage therethrough under adverse conditions.

Briefly stated, there is featured in the invention herein disclosed a pair of concentric stationary seal rings backed by corrugated bellows and riding on the same face of a disk member mounted on a shaft. One of said bellows has its external surface exposed to lubricant from the bearing carrying the shaft, while the other of said bellows has its interior surface exposed to an impeller chamber or similar structure and is sealed therefrom preferably by means of a close running clearance ribbed seal. The space between the inside of one bellows and the outside of the other bellows is vented to a drain. A further feature herein provided is a sintered metal screen and filler ring, the latter receiving oil from the engine through the screen and discharging this oil through orifices which serve to cool the disk member, as well as to lubricate the bearings and one of the seal rings.

It is therefore a primary aim of the present invention to provide an all-metal seal arrangement which possesses high temperature resistant properties, and which functions effectively under both wet and dry sealing conditions.

Another object of this invention lies in the provision of a seal assembly comprising spaced concentric seal members, one of which is of the dry type and the other of the wet type, the space between the seals being provided with a drain to receive leakage and port the same overboard.

Another object of the invention is to provide a seal construction featuring the use of a filtering and metering member adjacent the seal assembly receiving a lubricant and controlling the flow of filtered lubricant to the seal assembly and operating parts of a pump with which the seal is associated.

A further object of the present invention is to provide a seal assembly having spaced normally wet and dry portions, the dry portion being effective upon failure of the wet portion to prevent passage of lubricant and functioning in combination with a labyrinth seal to stop fluid flow radially inwardly of the dry portion seal.

A still further object of this invention is to provide a pair of spaced stationary concentric seal rings in contact with a rotatable disk member carried upon a shaft and a filler ring member located adjacent said disk member, the filler member directing controlled quantities of filtered lubricant from a source and into contact with the disk member and shaft bearings to cool said ring member and lubricate said bearings.

Other objects and advantages of the invention will become more apparent during the course of the following description, particularly when taken in connection with the accompanying drawings.

In the drawings, wherein like numerals are employed to designate like parts throughout the same:

Figure 1 is a cross-sectional view of a portion of a pump, parts thereof being in elevation, and showing the seal assembly of this invention as installed therein;

Figure 2 is a detail sectional view of the filter and filler ring member utilized by applicants; and Figure 3 is a sectional view of one of the seal rings in contact with the disk member.

The seal assembly of this invention has been found particularly well adapted for use with an engine driven after-burner pump, and will be described in this connection herein. However, other uses for the novel seal arrangement will become apparent to those skilled in the art as the description proceeds, and it will be appreciated that the invention is not to be limited to the particular application described.

One of the problems encountered in the operation of pumps for jet engine after-burners is that said pumps are required to operate continuously whether or not fuel is being delivered from a source to the engine after-burner portion. Lubrication of the seals for the moving parts of the pump is accordingly at all times required, and in the event of stoppage of flow of a lubricating fluid to the seals, serious damage to the moving parts could well result. Applicant has, however, effected a solution to this problem by the provision of a combination of wet and dry seals constructed and arranged in the manner now to be described.

Referring now to the drawings, and first to Fig. 1, there is provided a casing 10 to which a cover 11 is secured by bolt means or the like 12. Extending throughout the length of the casing is a complexly shaped bore defining annular recesses 13 and 14, while passing generally centrally through the bore is a shaft 15 having an enlarged forward portion 16, an intermediate portion 17 and a reduced outer portion 18. It will be appreciated that outwardly of the reduced portion 18 of the shaft other pump structure is located, such as the pump impeller, and that the outer face 19 of the pump portion shown in Figure 1 will be exposed to fuel or other fluids during the pumping action.

Arranged circumferentially and spaced radially outwardly from the enlarged and intermediate portions of shaft 15 is a sleeve member 20, while located radially inwardly of said sleeve member are bearings 21 comprising inner and outer races 22 and 23, respectively, and shiftable elements or balls 24 located therebetween. The bearings are preferably maintained in position by clamping the inner races 22 thereof between a shoulder portion 25 on the enlarged forward portion 16 of the shaft and one end of a rotatable disk member 26.

The disc member 26 is secured by pressing or other means to the reduced portion 18 of the shaft, and is provided with a relatively slender neck or collar portion 27 integral with a tapered forward face 28 and relatively flat rearward face 29. Carried in continuous rubbing or sealing contact with the relatively flat bottom or rearward face 29 of the disk member 26 are a pair of concentrically arranged seal rings 30 and 31, the radially outward ring 30 being preferably of the wet type while the inner ring 31 is of the dry type. Graphite has to date been found quite suitable as a seal ring material; however, other substances may at times be preferred.

The outer seal ring 30 is spring pressed against the ring member face 29 and thus maintained in rubbing contact therewith by a bellows 32, and the inner ring 31 similarly urged against the ring member face 29 by a bellows 33. Between the bellows 32 and 33 is an annular space 34 into which may pass leakage from the wet seal 30. Each seal ring is of substantially identical configuration in cross-section, and as is shown in Fig. 3, includes a relatively sharp pointed portion 35 integral with a substantially rectangular base portion 36 and maintained in running contact with the disk member face 29 by the bellows spring action. One end of the bellows 33 opposite the dry seal ring 31 is preferably clamped between a cap member 37 and collar 38. The cap member will of course be secured by suitable means to the cover 11 for the casing 10, and the collar 38 pressed to the cap 37. The bellows 32 for the seal ring 30, on the other hand, is backed by an annular flange member 39 around which a turn of the bellows is taken as shown. Each seal ring is supported on at least two surfaces by the bellows, as appears in Fig. 3.

It may be found upon occasion, particularly when the seal assembly functions at high speeds, that the inner bellows 33 and inner seal ring 31 will gyrate. To substantially eliminate this condition, there may be located between the bellows 32 and 33 and adjacent the seal rings 30 and 31 a spring 58, which may be of the finger type and includes a generally circular base 59 and a plurality of radially extending fingers 60. More effective sealing contact between the seal rings and disk member is obtained, and fatigue life increased.

A sleeve member 40 is suitably secured to the reduced portion 18 of the shaft, and rotates free from contact with the inner bellows 33. Provided at one end of the sleeve 40 along its outer circumference is a reduced portion 41 in which is received a ribbed or labyrinth type seal 42. The seal 42 is in close clearance running contact with the collar 38 between the sleeve 40 and cap member 37, and functions, as will be described in greater detail later, to hold back leakage from the dry seal 31 in the event of failure of the wet seal 30. A pressure drop drain 43 is provided in communication with the annular space 34 between the bellows 32 and 33, and passes through the cover 11 and overboard through an outlet 44 in the casing 10. The drain is effective to vent any leakage which may pass radially inwardly past the wet seal ring 30, either in the nature of seepage or such as may arise upon complete failure of the wet seal. The drain will normally port such leakage overboard and thus prevent contact of the lubricant with the dry seal. Further, the drain and labyrinth seal will prevent or limit leakage to locations not desired even in the remote event that there was also complete failure of the dry seal ring 31.

Novel means are further herein provided to direct oil or other lubricant substantially simultaneously to the bearings 21 and against the disk member 26 to cool the same. Arranged in abutting contact with the annular flange member 39 is a spacer ring 45, while between said spacer and the sleeve 20 is a metal filler ring 46. The filler ring is provided with leg portions 47 and 48, the latter abutting against the spacer ring 45, while the former is in engagement with a portion of the end wall of the sleeve member 20 through a ledge 49 provided on said leg 47. Extending between said leg portions of the filler ring is a connecting portion 50. Maintained at one end between the leg portion 47 of the filler ring 46 and the end wall of the sleeve member 20, and at its opposite end between the casing inner diameter and leg portion 48 of said filler ring, is a metal screen or filter 51 which preferably is of the sintered type. Contaminants in the oil are thereby excluded by the sintered filter.

A relatively slender annular passage 52 is provided between the sleeve 20 and casing 10, and oil or other lubricant is received through this passage from the engine and directed into a chamber 53 defined by the filler ring 46, end wall of the sleeve 20 and inner diameter of the casing 10. A plurality of orifices are included in the filler ring, and it is through these openings, that the oil is properly distributed.

Specifically, there is provided in the leg portion 47 of the filler ring 46 an orifice 54 through which oil or other lubricant is directed to the bearings 21 to lubricate the same, while generally centrally of the connecting portion 50 between the legs 47 and 48 of said ring is an orifice 55 through which passes the lubricating medium to cool the tapered face 28 of the disk member 26. An orifice 56 is further provided in the leg portion 48 of the filler ring 46, and this orifice communicates with a passage 57 in the spacer ring 45 to direct the oil from the annular chamber 53 against the periphery of the disk member 26 for cooling purposes. A portion of the oil passing through the orifice 56 and passage 57 additionally flows against the seal ring 30.

The orifices 54, 55, and 56 in the filler ring 46, as well as the passage 57 in the spacer ring 45, are of a diameter and location to assure that required quantities of oil are delivered to the bearings 21, and that the necessary quantities of said lubricant will be available to cool the disc member 26. The tapered face and periphery of the high speed rotating disk member 26 are thus effectively maintained at the proper operating temperature, and the bearings held properly lubricated, by the substantially simultaneous flow of oil thereagainst through the communicating orifices in the filler ring.

It may be seen from the foregoing description that applicant has provided a double-stacked, radially arranged seal construction which effectively prevents the passage of oil into an area of the pump structure which would be contaminated by said lubricant. The wet seal ring 30 is normally adequate to prevent the flow of lubricant radially inwardly of its contact region with the disk member 26; however, in the event of moderate leakage of said wet seal, there is provided by applicant the dry seal ring 31 to effect a stoppage of the lubricant and the drain 43 to vent the leakage from the space 34 overboard. In addition, even in the remote event that fast leakage occurs, as by complete failure of both seal rings 30 and 31, provision of the drain and pressure drop across the labyrinth type seal 42 prevents passage of lubricant in any substantial amounts radially inwardly of the dry seal bellows 33, and assures that such leakage will pass through the drain 43 and be thereby vented overboard through the outlet 44. By the novel combination of seals and drain passage, the likelihood of leakage is precluded and damage to other pump structure rendered substantially impossible. Further, by provision of an effective dry seal, lubrication of the seal is not required and damage will not occur even though the source of lubricant for the wet seal is stopped.

The novel filler ring also herein disclosed provides an effective directing means for the lubricant received through the oil passage 52 and directs said oil against the bearings 21 to lubricate said bearings and also against the tapered face and periphery of the disc member 26 to cool the same. A metal screen, which preferably is of sintered construction, and located between the lubricant passage 52 and the filler ring 46 serves well to prevent the passage into the bearings and against the disc member of any foreign particles which might have harmful effects thereon. Each of the several elements provided by applicant are relatively simple to assemble and to install, and being of an all-metal and high temperature resistant construction, will provide long carefree service under exceptionally severe operating conditions.

It is to be understood that the form of the invention herein shown and described is to be taken as the preferred embodiment of the same, but that various changes in the size, shape and arrangement of parts may be effected without departing from the spirit of the invention and the scope of the subjoined claims.

I claim as my invention:

1. A seal assembly for pumps and the like, comprising a shaft and a disc member rotatable therewith and having a substantially flat face, a pair of stationary spaced seal rings surrounding said shaft and having portions in continuous rubbing contact with the face of the disc member, a source of lubricating medium, a filler ring positioned adjacent said disc member and having a plurality of openings therethrough receiving lubricant from said source and directing the same against the disc member and one of said seal rings, and a drain extending into the space between the pair of seal rings receiving leakage from the lubricated seal ring and passing the same overboard.

2. A seal assembly for pumps and the like, comprising a shaft and a disc member rotatable therewith and having a substantially flat face, a pair of spaced stationary seal rings concentrically located about said shaft and having portions in continuous rubbing contact with the face of the disc member, a pair of spaced spring means independently urging the portions of each of said seal rings against the disc face, a source of lubricating medium, a filler ring located adjacent the disc member and having openings receiving the lubricant and directing the same against the disc member and one of the pair of seal rings, the space between the spring means receiving lubricant leaking past the one seal ring, and a drain connected to said space and porting the leakage overboard normally prior to contact with the other of said seal rings.

3. In a pump which includes a rotatable shaft, bearings for said shaft, a source of lubricating medium and a disc member secured to said shaft, a seal assembly comprising a pair of spaced stationary concentric seal rings surrounding said shaft and having shaped portions in rubbing contact with one face of the disc member, spaced bellows means bearing against the seal rings and independently springably urging the shaped portions of the seal rings against one face of the disc member, and a filler ring having orifices in communication with the source of lubricating medium and directing the medium substantially simultaneously against the bearings, the opposite face of the disc member and the periphery thereof, the bellows means for said seal rings defining therebetween a lubricant leakage cavity into which leakage from the radially outward seal ring may pass and be vented overboard prior to passage radially inwardly and into contact with the other seal ring.

4. In a pump which includes a housing and a rotatable shaft supported therein, bearings for the shaft, a sleeve member between the housing inner walls and bearings, a disc member secured to the shaft, and a source of lubricant and a passage in the housing to carry said lubricant rearwardly; the combination with a seal assembly comprising a pair of spaced stationary seal rings in rubbing contact with one face of the disc member and a filler ring positioned between the sleeve member and inner walls of the housing and having orifices in communication with the lubricant passage in the housing to direct lubricant substantially simultaneously to the bearings to lubricate the same and against the opposite face and periphery of the rotatable member to cool the same.

5. In a pump which includes a housing and a rotatable shaft supported therein, bearings for the shaft, a sleeve member between the housing inner walls and bearings, a disc member secured to the shaft, and a source of lubricant and a passage in the housing to carry said lubricant rearwardly; the combination with a seal assembly comprising a pair of spaced stationary seal rings in rubbing contact with one face of the disc member, a filler ring positioned between the sleeve member and inner walls of the housing and having orifices in communication with the lubricant passage in the housing to direct lubricant substantially simultaneously to the bearings to lubricate the same and against the opposite face and periphery of the rotatable disc member to cool the same, a filter between the lubricant passage in the housing and the filler ring, and a drain passage in communication with the space between the seal rings and an outlet in the housing to vent any lubricant leaking past one of said seal rings and radially inwardly thereof.

6. In a pump which includes a housing and a rotatable shaft supported therein, bearings for the shaft, a sleeve member between the housing inner walls and bearings, a disc member secured to the shaft, and a source of lubricant and a passage in the housing to carry said lubricant rearwardly; the combination with a seal assembly comprising a pair of concentric stationary seal rings spaced from one another and from the rotatable shaft and in rubbing contact with one face of the disc member, a filler ring positioned between the sleeve member and inner walls of the housing and having orifices in communication with the lubricant passage in the housing to direct lubricant substantially simultaneously to the bearings to lubricate the same and against the opposite face and periphery of the rotatable disc member to cool the same, and a labyrinth seal at one end of the space between one of said seal rings and the shaft to prevent passage of lubricant axially outwardly from said space in the event of lubricant leakage radially inwardly past both of the seal rings.

7. In a pump which includes a housing and a rotatable shaft supported therein, bearings for the shaft, a sleeve member between the housing inner walls and bearings, a disc member secured to the shaft, and a source of lubricant and a passage in the housing to carry said lubricant rearwardly; the combination with a seal assembly comprising a pair of spaced stationary seal rings in rubbing contact with one face of the disc member and a filler ring having leg portions bearing axially against one end of the sleeve member and radially outwardly against the housing inner diameter and a connecting portion between said leg portions and located generally parallel to another face of the disc member, each of said portions having at least one orifice therein and in communication with the lubricant passage in the housing and source of lubricant, the orifice in the leg portion directing lubricant to the bearings, the orifice in the other leg portion directing lubricant to the periphery of the disc member and one of the seal rings, and the connecting portion orifice flowing lubricant against the other face of the disc member to cool the same.

8. A seal of the relatively rotating ring type which comprises a rotatable member having a seal face, an inner seal ring and an outer seal ring riding on said face, an inner expansible tube carrying the inner ring, an outer expansible tube carrying the outer ring and surrounding the inner tube in spaced relation to provide an annular chamber between the tubes, the outside of the outer tube and the inside of the inner tube being exposed respectively to the two areas being sealed from each other, and means venting the chamber between the tubes to a drain outlet whereby leakage fluid from either of said two areas will be drained before it can reach the other area.

9. A seal of the relatively rotating ring type which comprises a rotatable member having a seal face, an inner seal ring and an outer seal ring riding on said face, an inner expansible spring bellows carrying the inner ring, an outer expansible spring bellows carrying the outer ring and surrounding the inner bellows in spaced relation to provide an annular chamber between the two bellows, the outside of the outer bellows and the inside of the inner bellows being exposed respectively to the two areas being sealed from each other, and means venting the chamber between the bellows to a drain outlet whereby leakage fluid from either of said two areas will be drained before it can reach the other area.

10. A seal of the relatively rotating ring type which comprises a rotatable member having a seal face, an inner seal ring and an outer seal ring riding on said face, an inner expansible tube carrying the inner ring, an outer expansible tube carrying the outer ring and surrounding the inner tube in spaced relation to provide an annular chamber between the tubes, the outside of the outer tube and the inside of the inner tube being exposed respectively to the two areas being sealed from each other, means venting the chamber between the tubes to a drain outlet whereby leakage fluid from either of said two areas will be drained before it can reach the other area, and spring means between the inner and outer tubes and adjacent the inner and outer seal rings to substantially eliminate gyration of said tubes and rings.

11. A seal of the relatively rotating ring type which comprises a rotatable member having a seal face, an inner seal ring and an outer seal ring riding on said face, an inner expansible spring bellows carrying the inner ring, an outer expansible spring bellows carrying the outer ring and surrounding the inner bellows in spaced relation to provide an annular chamber between the two bellows, the outside of the outer bellows and the inside of the inner bellows being exposed respectively to the two areas being sealed from each other, means venting the chamber between the bellows to a drain outlet whereby leakage fluid from either of said two areas will be drained before it can reach the other area, and spring means between the inner and outer bellows and adjacent the inner and outer seal rings to substantially eliminate gyration between said bellows and said rings.

References Cited in the file of this patent

UNITED STATES PATENTS

| | | |
|---|---|---|
| 1,737,777 | Spreen | Dec. 3, 1929 |
| 2,036,308 | Vroom | Apr. 7, 1936 |
| 2,300,385 | Kollberg et al. | Oct. 27, 1942 |

FOREIGN PATENTS

| 877,519 | Germany | May 26, 1953 |